(12) United States Patent
Kawano

(10) Patent No.: US 7,576,976 B2
(45) Date of Patent: Aug. 18, 2009

(54) DISPLAY DEVICE

(75) Inventor: Masayuki Kawano, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/968,952

(22) Filed: Jan. 3, 2008

(65) Prior Publication Data

US 2008/0218954 A1 Sep. 11, 2008

(30) Foreign Application Priority Data

Mar. 8, 2007 (JP) .............................. 2007-058119

(51) Int. Cl.
*H05K 5/00* (2006.01)
*H05K 7/00* (2006.01)

(52) U.S. Cl. ..................... 361/679.21; 349/58

(58) Field of Classification Search ................ 361/681, 361/679.21; 313/493; 349/58
See application file for complete search history.

(56) References Cited

U.S. PATENT DOCUMENTS

| | | | | |
|---|---|---|---|---|
| 6,741,298 B1 * | 5/2004 | Won | .............................. | 349/58 |
| 7,095,462 B2 * | 8/2006 | Ahn | .............................. | 349/58 |
| 7,113,237 B2 * | 9/2006 | Nitto et al. | ..................... | 349/58 |
| 2001/0035711 A1 * | 11/2001 | Itoh | .......................... | 313/493 |
| 2002/0186526 A1 * | 12/2002 | Kim | ........................... | 361/681 |
| 2002/0191125 A1 * | 12/2002 | Kim et al. | ...................... | 349/58 |
| 2004/0212756 A1 * | 10/2004 | Fukayama et al. | ............ | 349/58 |
| 2004/0246399 A1 * | 12/2004 | Ahn | ............................. | 349/58 |

FOREIGN PATENT DOCUMENTS

JP 2004-233849 8/2004

* cited by examiner

*Primary Examiner*—Jayprakash N Gandhi
*Assistant Examiner*—Anthony M Haughton
(74) *Attorney, Agent, or Firm*—Oblon, Spivak, McClelland, Maier & Neustadt, P.C.

(57) ABSTRACT

A display device includes: a rear frame having a bottom surface and a side surface, the side surface being provided with a female screw that projects outwardly; a flat light guide plate arranged inside the rear frame, the flat light guide plate receiving light from a light source to emit the same in a flat manner; a display panel opposed to the flat light guide plate, the display panel controlling the light emitted from the flat light guide plate to display an image; and a front frame with an opening facing the display panel, the front frame being provided with a fitting portion in the form of an aperture on its side surface, the fitting portion being fitted with the female screw which thereby forms a fixing member for fixation to an outer casing.

14 Claims, 7 Drawing Sheets

F I G . 1
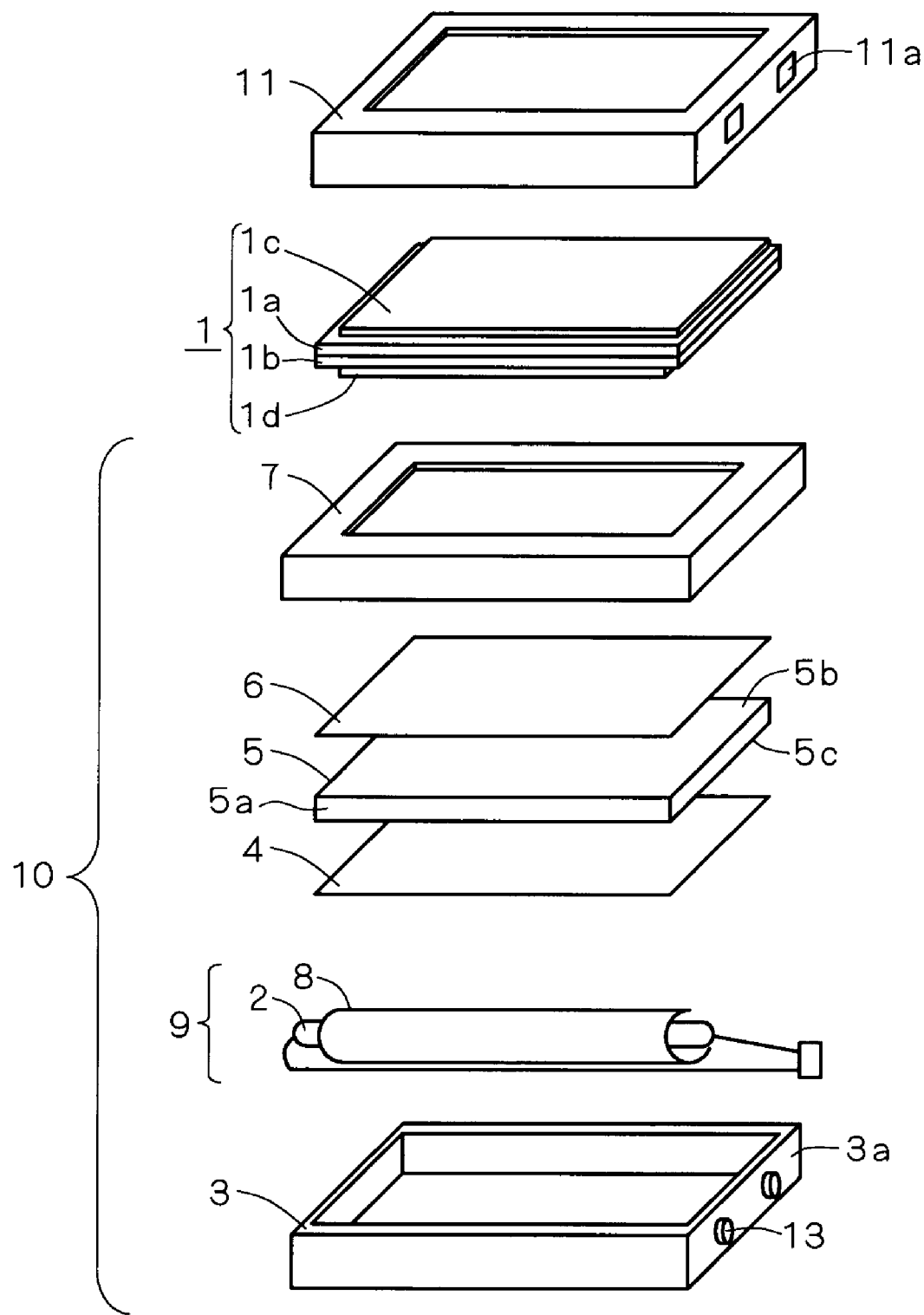

DISPLAY DEVICE

BACKGROUND OF THE INVENTION

1. Field of the Invention

The present invention relates to a fixing member of a display device.

2. Description of the Background Art

In recent years, a liquid crystal display (LCD) using a liquid crystal display panel has been widely used for various purposes for its lightness and thinness.

A liquid crystal display panel is formed by a glass substrate and a counter substrate provided with interconnect lines and electrodes. The glass substrate and the counter substrate are arranged in parallel, and liquid crystal is sandwiched between these substrates. Polarizing plates are attached to both surfaces of the liquid crystal display panel. A display area of the liquid crystal display panel is formed by a number of pixels. A signal is applied to each one of these pixels in accordance with a display image to thereby produce the image. Light emitted from a backlight system arranged on the back side of the liquid crystal display panel is applied to the display image, so that the image is visually recognized by a viewer.

That is, the liquid crystal display is a so-called light receiving display device including a liquid crystal display panel and a backlight system that control the light transmittance for each pixel. The liquid crystal display having these properties is widely applied for various purposes. By way of example, the liquid crystal display is employed as a display of a personal computer, or as a display device of equipment for commercial use.

For greater design flexibility of the liquid crystal display, size reduction of a frame except a display area is required to a minimum. In order to realize size reduction of the frame, a fixing member including a screw arranged on the side surface of the liquid crystal display is adopted to provide fixation to a casing.

An example of the liquid crystal display using the fixing member is introduced in Japanese Patent Application Laid-Open No. 2004-233849.

In one example of the liquid crystal display of the background art, a screw portion is provided at a rear frame. In this example, the screw portion is constructed in the form of a projection to enter a backlight system from the side surface of the rear frame. This requires space in the liquid crystal display to avoid the length of a screw to be inserted from the side surface, inhibiting size reduction of a frame.

In another example of the liquid crystal display of the background art that adopts a fixing member including a screw arranged on a side surface, a screw portion is provided at a front frame. In this example, the screw portion is constructed in the form of a projection to enter a backlight system from the side surface of the front frame. Then the screw portion is located near the outer periphery of a module, allowing space reduction. This however causes insufficient fixation of the backlight system stored in the module, failing to maintain sufficient strength.

SUMMARY OF THE INVENTION

It is an object of the present invention to provide a display device with a fixing member capable of realizing size reduction of a frame.

The present invention is intended for a display device including a rear frame, a flat light guide plate, a display panel and a front frame. The rear frame has a bottom surface and a side surface. The side surface is provided with a female screw that projects outwardly. The flat light guide plate is arranged inside the rear frame, and receives light from a light source to emit the same in a flat manner. The display panel is opposed to the flat light guide plate, and controls the light emitted from the flat light guide plate to display an image. The front frame has an opening facing the display panel. The front frame is provided with a fitting portion in the form of an aperture on its side surface. The fitting portion is fitted with the female screw which thereby forms a fixing member for fixation to an outer casing.

As the screw portion is located near the outer periphery of a module, fixation is realized by using a small screw. Thus the display device of the present invention realizes size reduction of a frame.

The present invention is also intended for a display device including a rear frame, a flat light guide plate, a middle frame, a display panel and a front frame. The rear frame has a bottom surface and a side surface. The flat light guide plate is arranged inside the rear frame, and receives light from a light source to emit the same in a flat manner. The middle frame is arranged inside the rear frame, and surrounds the flat light guide plate. The middle frame has a female screw on its side surface that projects outwardly. The display panel is opposed to the flat light guide plate, and is supported by the middle frame. The display panel controls the light emitted from the flat light guide plate to display an image. The front frame has an opening facing the display panel. The front frame is provided with a fitting portion in the form of an aperture on its side surface. The fitting portion is fitted with the female screw which thereby forms a fixing member for fixation to an outer casing.

A screw portion can be enlarged to thereby enhance a degree of shock resistance.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an exploded perspective view schematically showing the structure of a liquid crystal display according to a first preferred embodiment of the present invention;

DESCRIPTION OF THE PREFERRED EMBODIMENTS

First Preferred Embodiment

Figure 2:
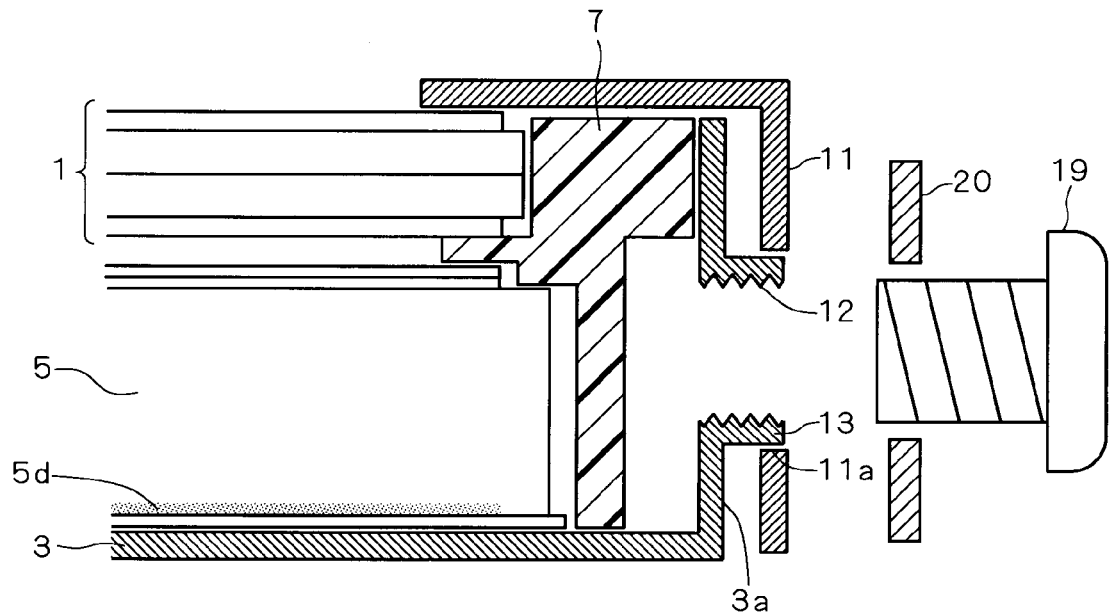
FIG. 2 is a sectional view showing the structure of a fixing part of the liquid crystal display according to the first preferred embodiment.

FIG. 1 is an exploded perspective view schematically showing the structure of a liquid crystal display according to a first preferred embodiment of the present invention. In the following, the structure of the liquid crystal display will be discussed.

The liquid crystal display includes: a backlight system 10 with a light source 2 and a flat light guide plate 5; a liquid crystal display panel 1 arranged on the front side of the backlight system 10 and which controls the transmittance of light emitted from the backlight system 10; and a front frame 11 for storing the backlight system 10 and the liquid crystal display panel 1 and which has a fitting portion 11a in the form of an aperture on its side surface.

The liquid crystal display panel 1 includes an upper substrate 1a and a lower substrate 1b. One of the upper substrate 1a and the lower substrate 1b is a TFT array substrate formed with a colored layer, a light shielding layer, a thin film transistor (hereinafter referred to as a TFT), an electrode such as a pixel electrode and an interconnect line. The other is an opposite substrate. The liquid crystal display panel 1 further includes: a spacer for maintaining uniform space between the two substrates; a sealing agent for bonding the two substrates together; a sealing material for providing sealing after liquid crystal is introduced between the two substrates; an orientation film for providing initial orientation of liquid crystal; polarization plates 1c, 1d for allowing only a specific polarization component of light emitted from the backlight system 10 to pass therethrough, and the like.

The flat light guide plate 5 includes an optical sheet 6 and a reflective plate 4. A light incident plane 5a is arranged to face the light source 2. A light exit plane 5b is arranged substantially perpendicular to the light incident plane 5a. A plane 5c facing the light exit plane 5b is provided with a printed dot pattern 5d for disturbing a direction of light propagation. The flat light guide plate 5 is formed by an acrylic material, a polycarbonate material or a transparent body such as glass. Instead of providing the printed dot pattern 5d on the plane 5c, the light exit plane 5b or the plane 5c may be roughened. The light exit plane 5b or the plane 5c may alternatively be an uneven surface formed for example by small spherical surfaces or prism for varying a direction of light propagation.

The optical sheet 6 is a diffusion sheet arranged near the light exit plane 5b of the flat light guide plate 5. The optical sheet 6 may be formed by a plurality of sheets. Alternatively, the optical sheet 6 may be a prism sheet, or further alternatively, an optical sheet is not necessarily required. The reflective plate 4 is arranged near the flat light guide plate 5 except for the light incident plane 5a and the light exit plane 5b. The reflective plate 4 is formed by a diffusion reflective material with reflectivity of 90% or higher. The reflective plate 4 may alternatively be a silver-evaporated sheet for realizing regular reflection.

Next, a light source unit 9 will be discussed that includes the light source 2, a reflector 8 and the like. The light source 2 is covered with the reflector 8, and is formed by a lamp. The light source 2 may alternatively be a lineup of light sources such as LEDs. The reflector 8 serves to reflect light emitted from the light source 2 to allow the reflected light to enter the light incident plane 5a. The reflector 8 is formed by a diffusion reflective material with reflectivity of 90% or higher and a metal plate that are bonded together. The reflector 8 may alternatively be formed by a silver-evaporated sheet for realizing regular reflection and a material for realizing polarized reflection that are bonded together. Still alternatively, the reflector 8 may be formed by a coated material or a mirror-finished material.

FIG. 2 is a sectional view showing the structure of a fixing part of the liquid crystal display shown in FIG. 1 according to the first preferred embodiment. The liquid crystal display includes a middle frame 7 for supporting the liquid crystal display panel 1 on the flat light guide plate 5, and a metal rear frame 3 having a screw hole for fixation. The screw hole has a screw projection 13 that projects outwardly of the light guide plate 5 from a side surface 3a of the rear frame 3.

The screw projection 13 is formed integrally with the rear frame 3, and is in the form of a burr 13 that projects outwardly from the side surface 3a. A screw portion 12 used for fixation is provided inside the burr 13. The screw projection 13 in the form of a burr is fitted with the fitting portion 11a formed in the front frame 11 to thereby make positioning of the backlight system 10 and the front frame 11. A screw 19 is threadedly engaged with the screw portion 12 to thereby form a fixing member that realizes fixation to an outer casing 20. The liquid crystal display panel 1 is supported by the middle frame 7. The middle frame 7 is fixed by the rear frame 3 and the front frame 11 to thereby fix the liquid crystal display panel 1.

Figure 10:
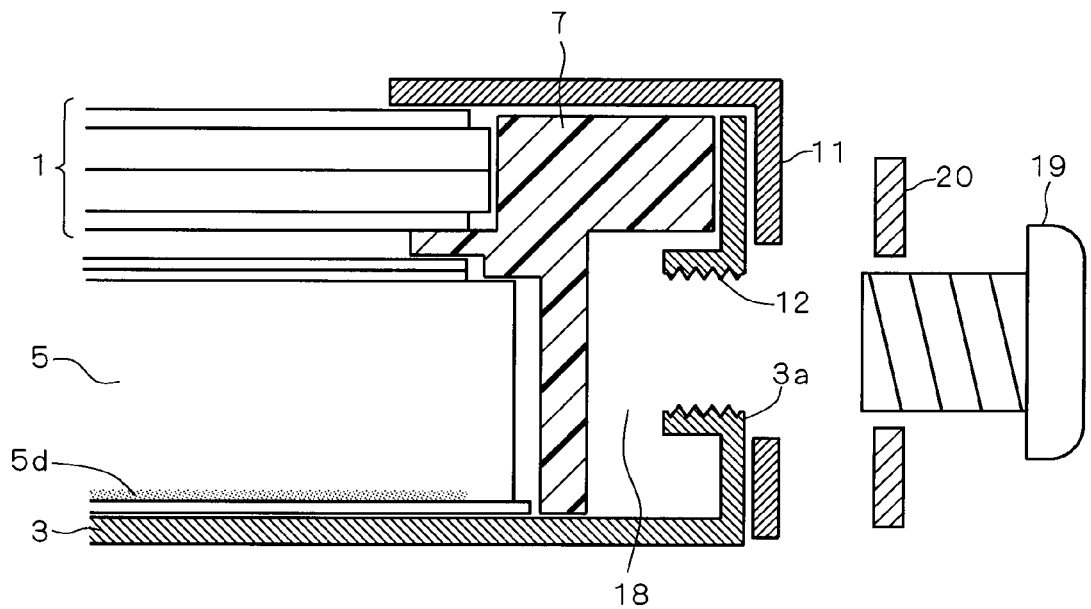
FIGS. 10 to 12 are sectional views each showing the structure of a fixing part of a liquid crystal display of the background art.
Figure 11:
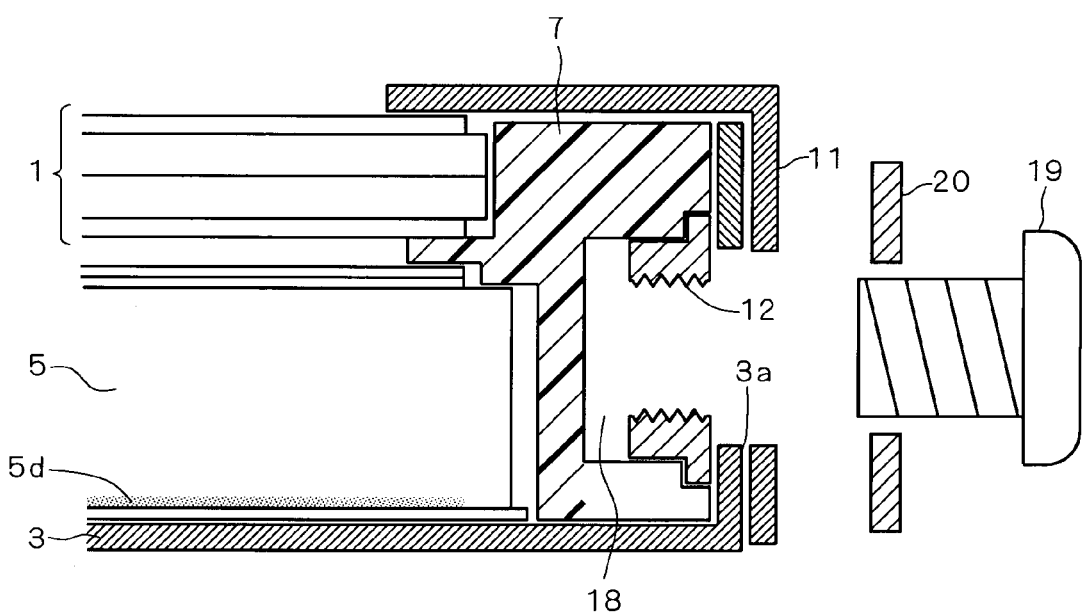
Figure 12:
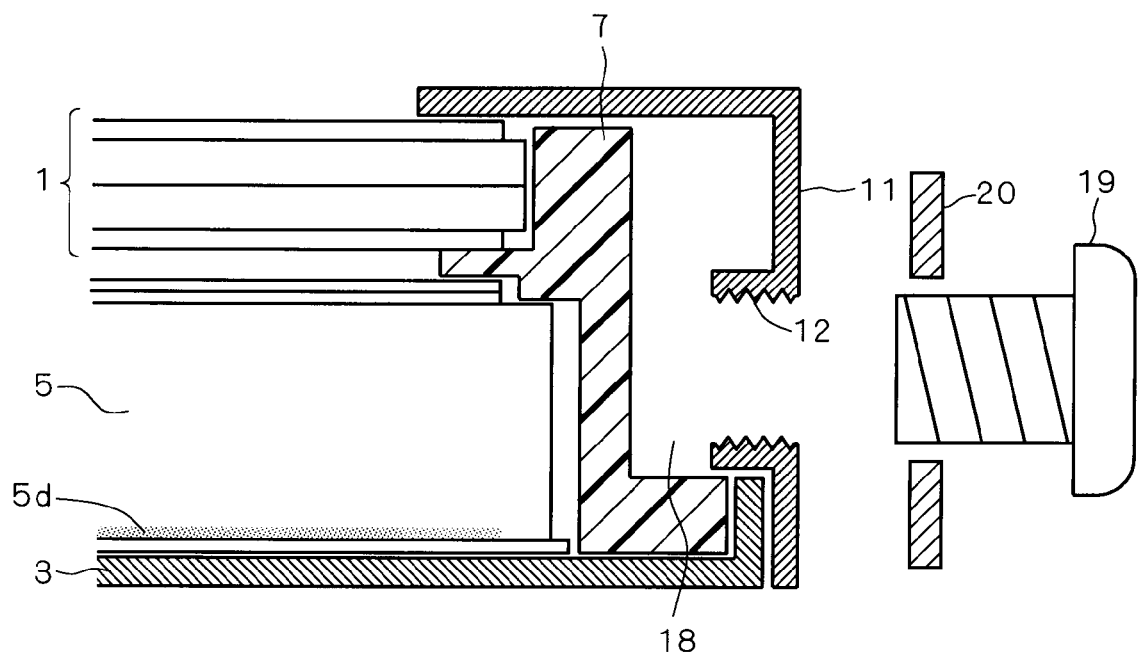

FIGS. 10 to 12 are sectional views each partially showing a liquid crystal display using a fixing part of the background art. In each of the liquid crystal displays shown in FIGS. 10 and 11, the screw portion 12 is formed so as to project toward a backlight system from the side surface 3a of the rear frame 3. Space 18 for avoiding the length of the screw 19 is defined inside the liquid crystal display. In the liquid crystal display shown in FIG. 12, the screw portion 12 is formed so as to project toward a backlight system from the side surface of the front frame 11, thereby fixing the screw portion 12 to the external casing 20.

As discussed, in the liquid crystal display of the background art, the burr 13 of the metal rear frame 3 and the space 18 for avoiding a screw to be inserted for fixation of a module are provided to the middle frame 7. In contrast, according to the present invention, the burr 13 projects outwardly, so that the screw portion 12 is allowed to be close to the outer periphery of a module. This allows reduction or elimination of space for the middle frame 7, thereby obtaining a liquid crystal display that realizes a greater degree of size reduction of a frame. The burr 13 and the front frame 11 are fitted together to make positioning of the screw portion 12 and the front frame 11 without requiring an additional positioning mechanism.

In the structure shown in FIG. 2, the fitting portion 11a of the front frame 11 is in the shape of a hook that is in contact in part with the burr 13 to support the liquid crystal display panel 1. The fitting portion 11a may alternatively be a notch 11b as shown in the side view of the screw portion 12 illustrated in FIG. 3. In this case, positioning may be made only in a direction of the plane of the liquid crystal display panel 1.

Second Preferred Embodiment

Figure 4:
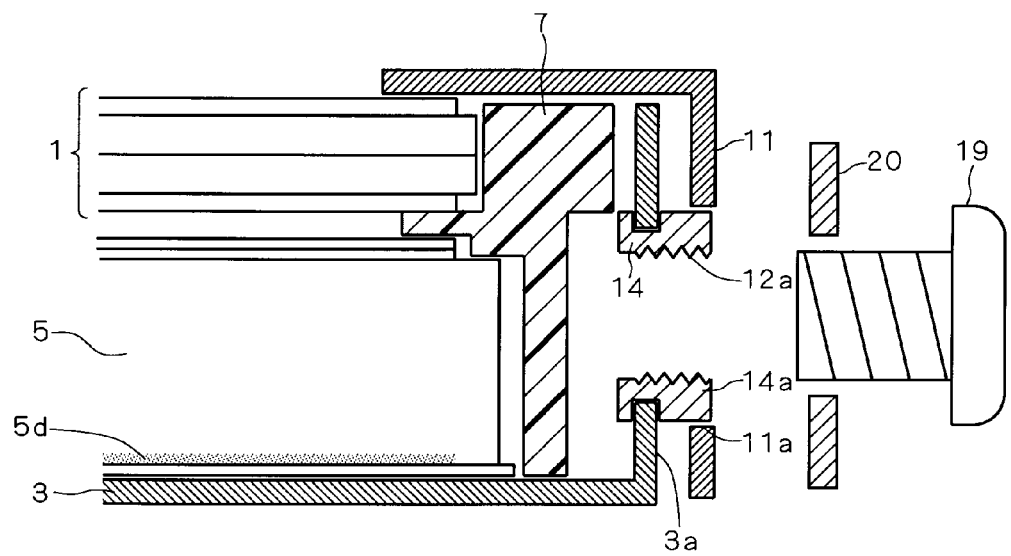
FIG. 4 is a sectional view showing the structure of a fixing part of a liquid crystal display according to a second preferred embodiment of the present invention.

FIG. 4 is a sectional view partially showing a liquid crystal display according to a second preferred embodiment of the present invention. Differences from the first preferred embodiment will be discussed. The liquid crystal display of the second preferred embodiment includes a middle frame 7 for supporting a liquid crystal display panel 1 on a flat light guide plate 5, and a metal rear frame 3 having a screw hole for fixation. The screw hole has a screw projection 14a that projects outwardly of the flat light guide plate 5 from a side surface 3a of the rear frame 3.

The screw projection 14a is a nut 14 joined with the side surface 3a of the rear frame 3. A screw portion 12a used for fixation is provided inside the nut 14. The screw projection 14a formed by the nut 14 is fitted with a fitting portion 11a formed in a front frame 11 to thereby make positioning of a backlight system 10 and the front frame 11. The other structures are the same as those of the first preferred embodiment, and will not be discussed again.

The use of the nut 14 allows the screw portion 12a and the screw projection 14a to be different in material and thickness from the rear frame 3. Thus the screw portion 12a and the screw projection 14a are allowed to have an enhanced degree of shock resistance.

Third Preferred Embodiment

Figure 5:
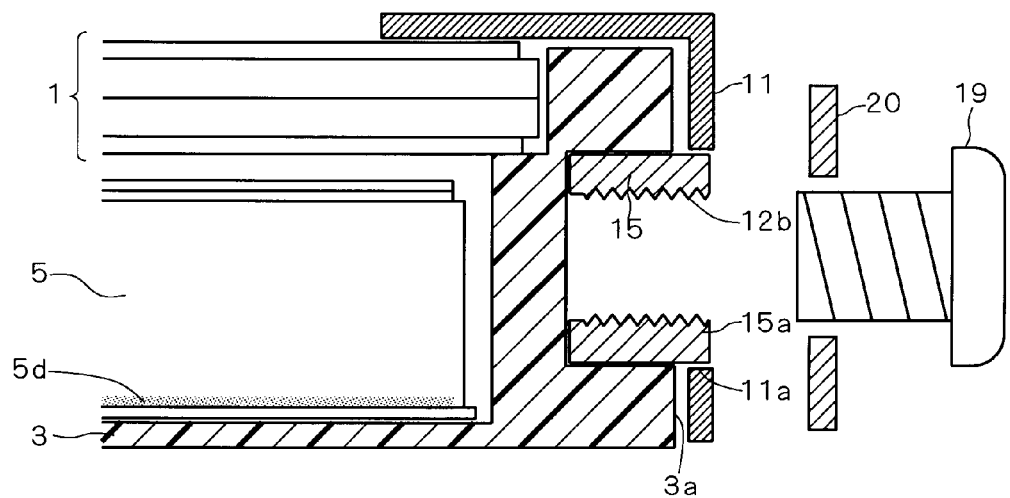
FIG. 5 is a sectional view showing the structure of a fixing part of a liquid crystal display according to a third preferred embodiment of the present invention.

FIG. 5 is a sectional view partially showing a liquid crystal display according to a third preferred embodiment of the present invention. Differences from the first preferred embodiment will be discussed. The liquid crystal display of the third preferred embodiment includes a plastic rear frame 3 for supporting a liquid crystal display panel 1 on a flat light guide plate 5. The rear frame 3 has a screw hole for fixation. The screw hole has a screw projection 15a that projects outwardly of the flat light guide plate 5 from a side surface 3a of the rear frame 3.

The screw projection 15a is a nut 15 joined with the side surface 3a of the rear frame 3. A screw portion 12b used for fixation is provided inside the nut 15. The screw projection 15a formed by the nut 15 is fitted with a fitting portion 11a formed in a front frame 11 to thereby make positioning of a backlight system 10 and the front frame 11. The liquid crystal display panel 1 is supported by the rear frame 3. The rear frame 3 and the front frame 11 are fixed to thereby fix the liquid crystal display panel 1. The other structures are the same as those of the first preferred embodiment, and will not be discussed again.

The nut 15 is joined with the plastic rear frame 3. Thus, as compared to the joining with a metal rear frame, the screw portion 12b of the nut 15 can be enlarged. As a result, the screw portion 12b is allowed to have an enhanced degree of shock resistance.

Fourth Preferred Embodiment

Figure 6:
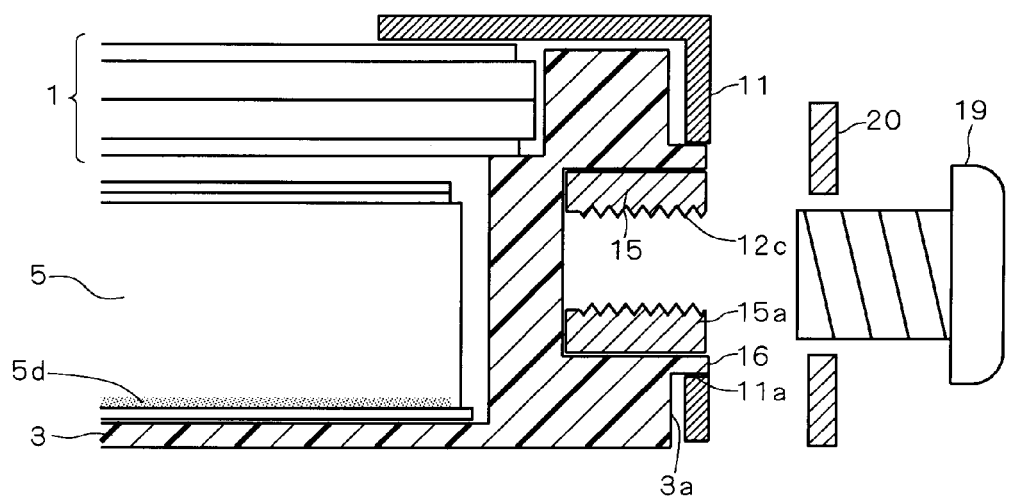
FIG. 6 is a sectional view showing the structure of a fixing part of a liquid crystal display according to a fourth preferred embodiment of the present invention.

FIG. 6 is a sectional view partially showing a liquid crystal display according to a fourth preferred embodiment of the present invention. Differences from the first preferred embodiment will be discussed. The liquid crystal display of the fourth preferred embodiment includes a plastic rear frame 3 for supporting a liquid crystal display panel 1 on a flat light guide plate 5. The rear frame 3 has a screw hole for fixation. The screw hole has a screw projection 16 that projects outwardly of the flat light guide plate 5 from a side surface 3a of the rear frame 3.

The screw projection 16 is the rear frame 3 projecting outwardly of the flat light guide plate 5. A screw portion 12c used for fixation is provided inside a nut 15 that is joined with the side surface 3a of the rear frame 3. The screw projection 16 formed by the rear frame 3 is fitted with a fitting portion 11a formed in a front frame 11 to thereby make positioning of a backlight system 10 and the front frame 11. The other structures are the same as those of the first preferred embodiment, and will not be discussed again.

Thus the screw projection 16 fitted with the front frame 11 is allowed to have an arbitrary shape, so that fitting with the front frame 11 can be easily realized.

Fifth Preferred Embodiment

Figure 7:
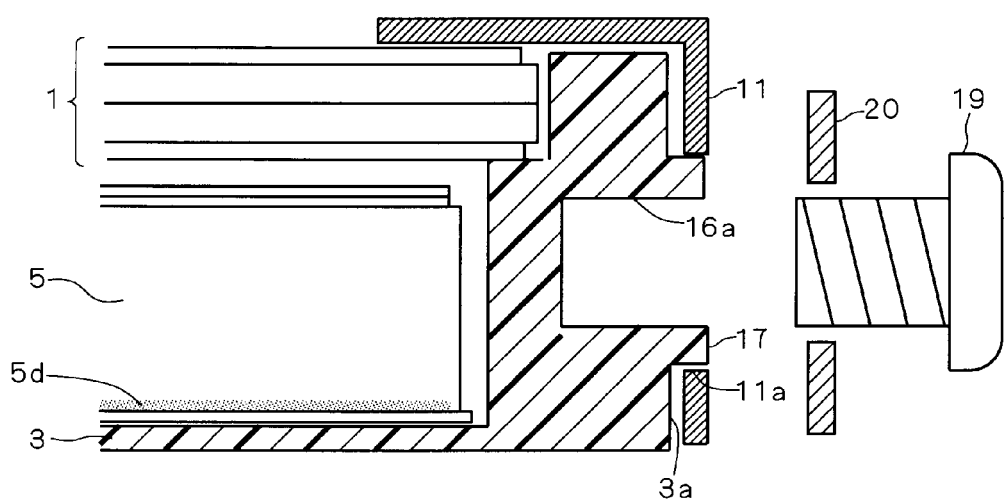
FIG. 7 is a sectional view showing the structure of a fixing part of a liquid crystal display according to a fifth preferred embodiment of the present invention.

FIG. 7 is a sectional view partially showing a liquid crystal display according to a fifth preferred embodiment of the present invention. Differences from the first preferred embodiment will be discussed. The liquid crystal display of the fifth preferred embodiment includes a plastic rear frame 3 for supporting a liquid crystal display panel 1 on a flat light guide plate 5. The rear frame 3 has a screw hole 16a for fixation. The screw hole 16a has a screw projection 17 that projects outwardly of the flat light guide plate 5 from a side surface 3a of the rear frame 3.

The screw projection 17 is the rear frame 3 projecting outwardly of the flat light guide plate 5. The screw hole 16a provided to the rear frame 3 serves as a pilot hole for a tapping screw used for fixation. The screw projection 17 formed by the rear frame 3 is fitted with a fitting portion 11a formed in a front frame 11 to thereby make positioning of a backlight system 10 and the front frame 11. The other structures are the same as those of the first preferred embodiment, and will not be discussed again.

Thus the screw projection 17 fitted with the front frame 11 is allowed to have an arbitrary shape, so that fitting with the front frame 11 can be easily realized. Further, the liquid crystal display can be provided at a low cost without requiring an additional component such as a nut.

Sixth Preferred Embodiment

Figure 8:
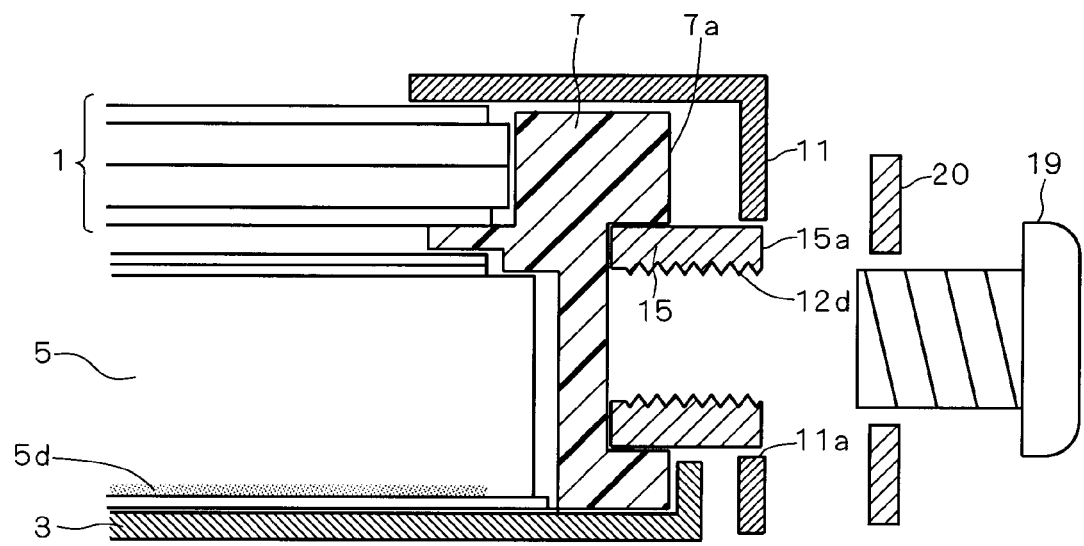
FIG. 8 is a sectional view showing the structure of a fixing part of a liquid crystal display according to a sixth preferred embodiment of the present invention.

FIG. 8 is a sectional view partially showing a liquid crystal display according to a sixth preferred embodiment of the present invention. Differences from the first preferred embodiment will be discussed. The liquid crystal display of the sixth preferred embodiment includes a plastic middle frame 7 for supporting a liquid crystal display panel 1 on a flat light guide plate 5. The middle frame 7 has a screw hole for fixation. The screw hole has a screw projection 15a that projects outwardly of the flat light guide plate 5 from a side surface 7a of the middle frame 7.

The screw projection 15a is a nut 15 joined with the side surface 7a of the middle frame 7. A screw portion 12d used for fixation is provided inside the nut 15. The screw projection 15a formed by the nut 15 is fitted with a fitting portion 11a formed in a front frame 11 to thereby make positioning of a backlight system 10 and the front frame 11. The other structures are the same as those of the first preferred embodiment, and will not be discussed again.

The nut 15 is joined with the plastic middle frame 7. Thus, as compared to the joining with a metal rear frame 3, the screw portion 12d of the nut 15 can be enlarged. As a result, the screw portion 12d is allowed to have an enhanced degree of shock resistance.

Seventh Preferred Embodiment

Figure 9:
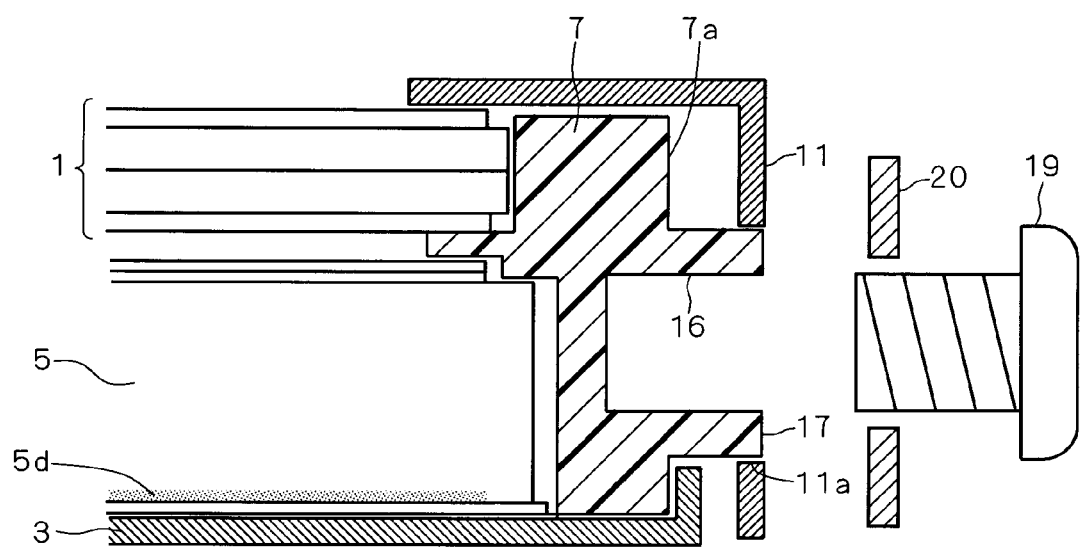
FIG. 9 is a sectional view showing the structure of a fixing part of a liquid crystal display according to a seventh preferred embodiment of the present invention.

FIG. 9 is a sectional view partially showing a liquid crystal display according to a seventh preferred embodiment of the present invention. Differences from the first preferred embodiment will be discussed. The liquid crystal display of the seventh preferred embodiment includes a plastic middle frame 7 for supporting a liquid crystal display panel 1 on a flat light guide plate 5. The middle frame 7 has a screw hole for fixation. The screw hole has a screw projection 17 that projects outwardly of the flat light guide plate 5 from a side surface 7a of the middle frame 7.

The screw projection 17 is the middle frame 7 projecting outwardly of the flat light guide plate 5. The screw hole provided to the middle frame 7 serves as a pilot hole for a tapping screw used for fixation. The screw projection 17 formed by the middle frame 7 is fitted with a fitting portion 11a formed in a front frame 11 to thereby make positioning of a backlight system 10 and the front frame 11. The other structures are the same as those of the first preferred embodiment, and will not be discussed again.

Thus the screw projection 17 fitted with the front frame 11 is allowed to have an arbitrary shape, so that fitting with the front frame 11 can be easily realized. Further, the liquid crystal display can be provided at a low cost without requiring an additional component such as a nut. Like the structure shown in FIG. 2, if the screw projection 17 is constructed in the shape of a burr formed integrally with the middle frame 7, the same effect as in the first preferred embodiment can be produced.

Figure 3:
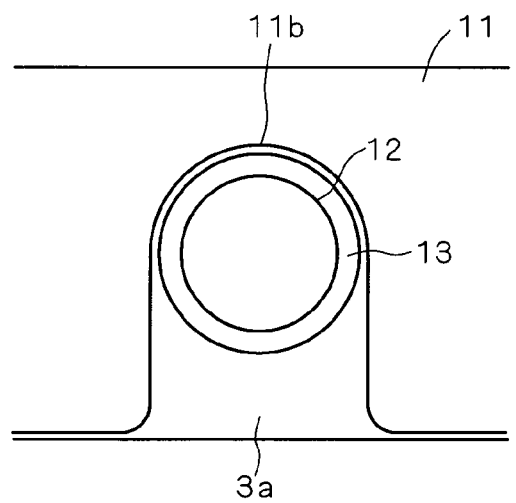
FIG. 3 is a side view of a fitting portion of a front frame of the liquid crystal display shown in FIG. 2.

As in the first preferred embodiment, in the second through seventh preferred embodiments, the fitting portion 11a of the front frame 11 may also be in the shape of a hook as shown in FIG. 3. In this case, positioning may be made only in a direction of the plane of the liquid crystal display panel 1.

While the invention has been shown and described in detail, the foregoing description is in all aspects illustrative and not restrictive. It is therefore understood that numerous modifications and variations can be devised without departing from the scope of the invention.

What is claimed is:

1. A display device comprising:
   a rear frame having a bottom surface and a side surface, said side surface being provided with a screw projection that projects outwardly from said side surface of the rear frame, said screw projection including a female thread;
   a flat light guide plate arranged inside said rear frame, said flat light guide plate being configured to receive light from a light source that is configured to emit light in a flat manner;
   a display panel opposed to said flat light guide plate, said display panel being configured to control said light emitted from said flat light guide plate to display an image; and
   a front frame with an opening facing said display panel, said front frame being provided with a fitting portion in the form of an aperture on a side surface of said front frame,
   wherein said screw projection is formed so as to project outwardly from said side surface of said rear frame in an unassembled state, and
   wherein said screw projection is fitted with said fitting portion, thereby positioning said flat light guide plate, said display panel and said front frame, and forming a fixing member configured to be fixed to an outer casing in an assembled state.

2. The display device according to claim 1, wherein said display panel is supported by said rear frame.

3. The display device according to claim 1, further comprising:
   a middle frame arranged inside said rear frame and at a position above said rear frame, said middle frame surrounding said flat light guide plate, wherein
   said display panel is supported by said middle frame.

4. The display device according to claim 1, wherein said screw projection is a burr formed integrally with said rear frame.

5. The display device according to claim 1, wherein said screw projection is a nut joined with said rear frame.

6. The display device according to claim 1, wherein said rear frame is made of plastic, and said screw projection is provided to said rear frame.

7. The display device according to claim 1, wherein said fitting portion is constructed in the form of a hook.

8. The display device according to claim 1, wherein said fitting portion is constructed in the form of a notch.

9. A display device, comprising:
   a rear frame having a bottom surface and a side surface,
   a flat light guide plate arranged inside said rear frame, said flat light guide plate is configured to receive light from a light source that is configured to emit light in a flat manner;
   a middle frame arranged inside said rear frame and surrounding said flat light guide plate, said middle frame having a screw projection that projects outwardly from a side surface of the middle frame, said screw projection including a female thread;
   a display panel opposed to said flat light guide plate and supported by said middle frame, said display panel being configured to control said light emitted from said flat light guide plate to display an image; and
   a front frame with an opening facing said display panel, said front frame being provided with a fitting portion in the form of an aperture on a side surface of said front frame,
   wherein said screw projection is formed so as to project outwardly from said side surface of said middle frame in an unassembled state, and
   wherein said screw projection is fitted with said fitting portion, thereby positioning said flat light plate, said display panel, and said front frame and said rear frame, and forming a fixing member configured to be fixed to an outer casing in an assembled state.

10. The display device according to claim 9, wherein said screw projection is a burr formed integrally with said middle frame.

11. The display device according to claim 9, wherein said screw projection is a nut joined with said middle frame.

12. The display device according to claim 9, wherein said middle frame is made of plastic, and said screw projection is provided to said middle frame.

13. The display device according to claim 9, wherein said fitting portion is constructed in the form of a hook.

14. The display device according to claim 9, wherein said fitting portion is constructed in the form of a notch.

* * * * *